(12) United States Patent
Fu et al.

(10) Patent No.: US 9,167,510 B2
(45) Date of Patent: Oct. 20, 2015

(54) METHOD AND APPARATUS FOR BLINDLY DETECTING A COMMON SEARCH SPACE AND A UE SPECIFIC SEARCH SPACE

(71) Applicant: Samsung Electronics Co., Ltd., Gyeonggi-do (KR)

(72) Inventors: Jingxing Fu, Beijing (CN); Yingyang Li, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 107 days.

(21) Appl. No.: 14/076,863

(22) Filed: Nov. 11, 2013

(65) Prior Publication Data

US 2014/0133331 A1 May 15, 2014

(30) Foreign Application Priority Data

Nov. 9, 2012 (CN) .......................... 2012 1 0445370

(51) Int. Cl.
*H04B 7/00* (2006.01)
*H04W 48/16* (2009.01)
*H04L 5/00* (2006.01)

(52) U.S. Cl.
CPC ................. *H04W 48/16* (2013.01); *H04L 5/00* (2013.01); *H04L 5/0053* (2013.01)

(58) Field of Classification Search
CPC .... H04W 76/02; H04W 76/021; H04W 76/04
USPC .................. 370/310, 329, 431, 437, 464, 465
See application file for complete search history.

(56) References Cited

U.S. PATENT DOCUMENTS

| 8,842,628 B2* | 9/2014 | Gao et al. ....................... 370/329 |
| 2013/0114529 A1* | 5/2013 | Chen et al. ..................... 370/329 |
| 2014/0254420 A1* | 9/2014 | Kim et al. ...................... 370/252 |
| 2015/0043355 A1* | 2/2015 | Kim et al. ...................... 370/241 |

OTHER PUBLICATIONS

LTE, E-UTRA, Physical layer procedures, 3GPP TS 36.213 version 11.0.0 Release 11, 3GPP, Oct. 2012, pp. 1-145.*
Fujitsu, "Requirements and Signalling for Configuration of UESSS and CSS on ePDCCH", R1-121199, 3GPP TSG RAN WG1 Meeting #68bis, Mar. 26-30, 2012.
Motorola Mobility, "Configuration of EPDCCH", R1-123788, 3GPP TSG RAN WG1 #70, Aug. 13-18, 2012.
NEC Group, "ePDCCH Search Space Design", R1-122595, 3GPP TSG RAN WG1 Meeting #69, May 21-25, 2012.
Fujitsu, "Motivation, Requirements and Design for Common Search Space on Enhanced Downlink Control Channels", R1-121194, 3GPP TSG-RAN WG1 #68bis, Mar. 26-30, 2012.
LG Electronics, "On the Necessity of Common Search Space on E-PDCCH", R1-121454, 3GPP TSG RAN WG1 Meeting #68bis, Mar. 26-30, 2012.

* cited by examiner

*Primary Examiner* — Dmitry H Levitan
(74) *Attorney, Agent, or Firm* — The Farrell Law Firm, P.C.

(57) ABSTRACT

Methods and apparatus are provided for blindly detecting a common search space and a UE specific search space. A location of a candidate EPDCCH occupied by a common search space is determined. A blind detection is performed for the candidate EPDCCH occupied by the common search space. A location of a candidate enhanced EPDCCH occupied by a UE specific search space is determined. A blind detection is performed for the candidate EPDCCH occupied by the UE specific search space.

12 Claims, 4 Drawing Sheets

METHOD AND APPARATUS FOR BLINDLY DETECTING A COMMON SEARCH SPACE AND A UE SPECIFIC SEARCH SPACE

PRIORITY

This application claims priority under 35 U.S.C. §119(a) to Chinese Patent Application No. 201210445370.7, which was filed in the State Intellectual Property Office of the People's Republic of China on Nov. 9, 2012, the content of each of which is incorporated herein by reference.

BACKGROUND OF THE INVENTION

1. Field of the Invention

The present invention relates generally to a wireless communication system, and more particularly, to a method and apparatus for blindly detecting a common search space and a User Equipment (UE) specific search space.

2. Background of the Invention

Figure 1:
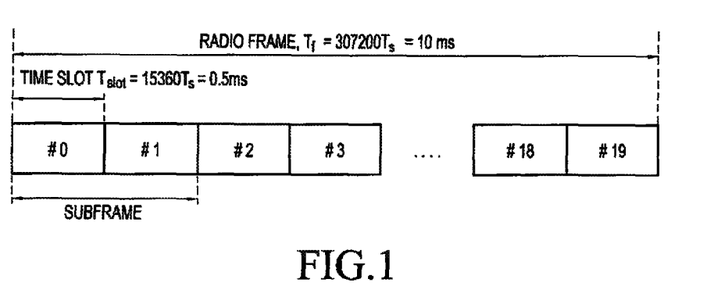
FIG. 1 is a diagram illustrating a frame structure in an FDD system.

In a 3$^{rd}$ Generation Partnership Project (3GPP) Long Term Evolution (LTE) system, the length of each radio frame is 10 ms, which is divided equally into 10 subframes. One downlink Transmission Time Interval (TTI) is defined on one subframe. FIG. 1 is a diagram illustrating a frame structure in a Frequency Division Duplex (FDD) system. Each downlink subframe includes two time slots. For a normal Cyclic Prefix (CP) length, each time slot includes 7 Orthogonal Frequency-Division Multiplexing (OFDM) symbols. For an extended CP length, each time slot includes 6 OFDM symbols.

Figure 2:
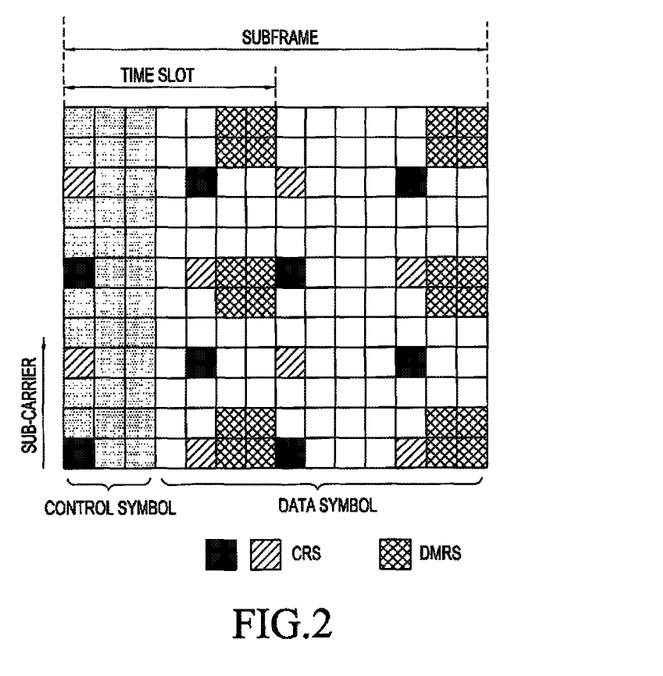
FIG. 2 is a diagram illustrating a subframe structure in LTE system.

FIG. 2 is a diagram illustrating a frame structure in an LTE system. The first n OFDM symbols, where n is equal to 1, 2 or 3, are used for transmitting downlink control information, including a Physical Downlink Control CHannel (PDCCH) and other control information. Remaining OFDM symbols are used for transmitting a Physical Downlink Shared CHannel (PDSCH). A granularity of resource allocation is a Physical Resource Block (PRB). One PRB includes 12 consecutive sub-carriers in frequency and corresponds to one time slot in time. Two PRBs in two time slots of the same sub-carrier in one subframe is referred to as a PRB pair. In each PRB pair, each Resource Element (RE) is a minimum unit of time and frequency resources, i.e., the RE includes one sub-carrier in frequency and includes one OFDM symbol in time. REs may be respectively used for different functionalities. For example, parts of the REs may be used respectively for transmitting a Cell specific Reference Signal (CRS), a user specific DeModulation Reference Signal (DMRS), a Channel State Information Reference Signal (CSI-RS), the PDCCH, the PDSCH, etc.

In the LTE system, for PDCCH transmission, a common search space and a UE specific search space are defined. The PDCCH is tracked through blind decoding of all sets of the common search space and the UE specific search space of a candidate PDCCH, and checking through Cyclic Redundancy Check (CRC) scrambled by a corresponding Radio Network Temporary Identifier (RNTI) (e.g., Cell-RNTI (C-RNTI)), to find the PDCCH scheduled by a base station. The number of candidate PDCCHs of the common search space and the UE specific search space is shown in Table 1. The common search space includes a search space with 4 Control Channel Elements (CCE) and a search space with 8 CCEs. The UE specific search space includes search spaces respectively with one CCE, 2 CCEs, 4 CCEs, and 8 CCEs. For each transmission mode, a UE needs to track two kinds of PDCCHs, which have different sizes of Downlink Control Information (DCI). Thus, for the common search space, the UE tracks 2*(4+2)=12 candidate PDCCHs. For the UE specific search space, the UE tracks 2*(6+2+2)=32 candidate PDCCHs.

TABLE 1

| | Search Space $S_k^{(L)}$ | | The number of |
|---|---|---|---|
| kind | Aggregative level L | Size [the number of CCEs] | candidate PDCCHs $M^{(L)}$ |
| UE specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

CCEs occupied by a PDCCH search space $S_k^{(L)}$ are $$L \cdot \{(Y_k+m) \bmod \lfloor N_{CCE,k}/L \rfloor\}+i, i=0,1,\ldots L-1$$

where L is an aggregation level, i.e., the number of the CCEs occupied by the search space;

k is an index of a subframe; and $N_{CCE,k}$ is the total number of the CCEs in subframe k.

For the common space, $Y_k$ is equal to 0. Specifically, locations of the CCEs occupied by all UE common search spaces are same. For the UE specific search space, $Y_k$ is equal to $(A \cdot Y_{k-1}) \bmod D$, where $Y_{-1}=n_{RNTI} \neq 0$, A=39827, D=65537, $n_{RNTI}$ is a value of a user radio network temporary identity.

The UE specific search space is related to the value of the user RNTI and the index of the subframe. Specifically, after the value of the user RNTI is determined, a location of the CCEs occupied by the UE specific search space is determined.

In an LTE Advanced (LTE-A) system, overload of backward control signals and CRSs is reduced. At the same time, interference introduced by the backward control signals and the CRSs is decreased. Thus, UE frequency utilization is improved. Since the overload of the CRS is reduced, system power saving performance is further improved. PDCCH transmission and PDSCH transmission in the system are usually based on DMRS demodulation, which is referred to as New Carrier Type (NCT).

The PDCCH based on the DMRS demodulation is referred to as an Enhanced Physical Downlink Control CHannel (EP-DCCH). A resource occupied by the EPDCCH is configured by a Radio Resource Control (RRC) signal. In an LTE release 11 system, the EPDCCH is only used for the UE specific search space, while the common search space uses the PDCCH. The EPDCCH is located in an EPDCCH set. The EPDCCH set is divided into a centralized EPDCCH set and a distributed EPDCCH set. The centralized EPDCCH set and the distributed EPDCCH set may occupy 2, 4 or 8 PRBs. Each UE configures 2 EPDCCH sets at most. Each EPDCCH is composed of 1, 2, 4, 8 or 16 Enhanced Control Channel Elements (ECCEs), while an ECCE is composed of 4 or 8 Enhanced Resource Element Groups (EREGs), and each PRB includes 16 EREGs.

The NCT may be divided into two kinds, based on whether it works as a stand-alone cell. For a non-stand-alone condition, the cell works only as a Secondary cell (Scell). For the secondary cell, the common search space is not needed to be configured based on current 3GPP specification. The common search space is configured in a Primary cell. The resource occupied by the UE specific search space composed of the EPDCCH may be configured by a high layer signal. Parameters required to be configured include whether the EPDCCH set used by the EPDCCH of the UE specific search space is centralized or distributed, the number of PRB pairs occupied by the EPDCCH set, and locations of the PRB pairs. Thus, the NCT may work normally as the Scell, where the NCT adopts the EPDCCH as the UE specific search space. For the stand-alone NCT, all LTE channels need to define an alternative technology in the NCT. Thus, an NCT cell may work normally.

SUMMARY OF THE INVENTION

The present invention has been made to address at least the above problems and/or disadvantages and to provide at least the advantages described below. Accordingly, an aspect of the present invention provides a method and an apparatus for blindly detecting a common search space and a UE specific search space, so that a new carrier type based on OFDM can work stand-alone, and the flexibility of applying the new carrier type is improved.

According to one aspect of the present invention, a method is provided for blindly detecting a common search space and a UE specific search space. The UE determines a location of a candidate EPDCCH occupied by a common search space. The UE performs a blind detection for the candidate EPDCCH occupied by the common search space. The UE determines a location of a candidate enhanced EPDCCH occupied by a UE specific search space. The UE performs a blind detection for the candidate EPDCCH occupied by the UE specific search space.

According to another aspect of the present invention, an apparatus is provided for blindly detecting a common search space and a UE specific search space. The apparatus includes an information obtaining module configured to determine a location of a candidate EPDCCH occupied by a common search space, and determine a location of a candidate EPDCCH occupied by a UE specific search space. The apparatus also includes a blind detection module configured to perform a blind detection for the candidate EPDCCH occupied by the common search space, and perform a blind detection for the candidate EPDCCH occupied by the UE specific search space.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 3:
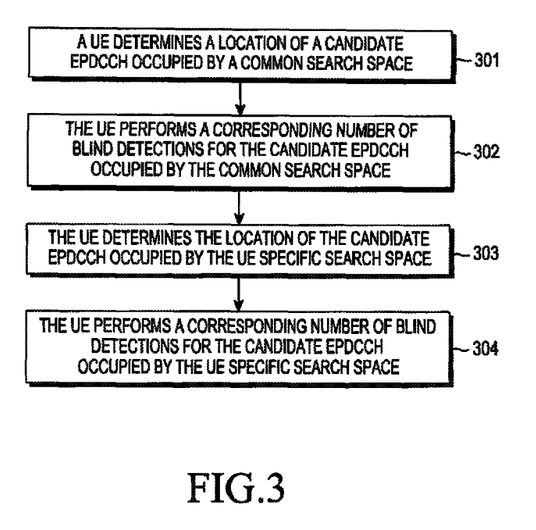
FIG. 3 is a diagram illustrating a method for blindly detecting a common search space and a UE specific search space, in accordance with an embodiment of the present invention.

When an NCT cell may work as a stand-alone cell, a method for blindly detecting a common search space and a UE specific search space is provided in embodiments of the present invention the present invention, as shown in FIG. 3.

In step 301, a UE determines a location of a candidate EPDCCH occupied by the common search space.

Configured time and frequency resource parameters of the common search space in an embodiment of the present invention include the number of candidate EPDCCH sets used to carry the common search space, a type of each candidate EPDCCH set (centralized or distributed), the number of PRB pairs occupied by a candidate EPDCCH set, a location of a combination of the PRB pairs, and a location of an ECCE occupied by the candidate EPDCCH in the candidate EPDCCH set.

When the common search space adopts the EPDCCH for scheduling, embodiments of the present invention provide three methods in which the UE determines a location of a candidate EPDCCH in the common search space.

In a first method for determining a location of a candidate EPDCCH in a common search space, the number of candidate EPDCCH sets, the type of each candidate EPDCCH set, and the number of the PRB pairs occupied by each candidate EPDCCH set are pre-defined. For example, the UE only tracks one candidate EPDCCH set in the common search space, the type of the candidate EPDCCH set is distributed, and the number of the PRB pairs occupied by an EPDCCH set of the common search space is 4.

In the parameters defined above, the location of the combination of the PRB pairs occupied by each candidate EPDCCH is determined through an implicit method, such as, for example, a Physical Cell Identity (PCI). For example, N candidate locations of EPDCCH sets are fixed. The location of the combination of the PRB pairs occupied by each candidate location is fixed. If it is assumed that N is equal to 3, the index of the EPDCCH set of the cell is a value obtained after the PCI modulo 3 is performed. For example, three EPDCCH sets are pre-defined, which are used to carry the common search space. If it is assumed the PCI of cell 1 is 208, 208 modulo 3 is 1. Thus, the EPDCCH set of the common search space of cell 1 is EPDCCH set 1. While for cell 1, EPDCCH set 0 and EPDCCH set 2, which are not used to carry the common search space, may be used to carry a PDSCH or the UE specific search space.

In the parameters defined above, the location of the ECCE occupied by the candidate EPDCCH in the candidate EPDCCH set is pre-defined. For example, the ECCE occupied by an EPDCCH search space $S_k^{(L)}$ is $$L \cdot \{(Y_k + m) \bmod \lfloor N_{CCE\_n,k}/L \rfloor\} + i, \quad i = 0, 1, \ldots L-1$$

where, L is an aggregation level, i.e., the number of ECCEs occupied by the search space;

k is an index of a subframe;

m is an index of the candidate EPDCCH, m is the index in an EPDCCH set, $m = 0, 1, \ldots M^{(L)} - 1$, $M^{(L)}$ is the number of candidate EPDCCHs of which the aggregation level is L and which are used for the common search space in an EPDCCH set.

n is an index of the EPDCCH set in subframe k;

$N_{CCE\_n,k}$ is the total number of the ECCEs in EPDCCH set n in subframe k; and $Y_k$ is equal to 0.

In a second method for determining a location of a candidate EPDCCH in a common search space, the number of the candidate EPDCCH sets, the type of a candidate EPDCCH set, and the number of the PRB pairs occupied by the candidate EPDCCH set are pre-defined. For example, the UE only tracks one candidate EPDCCH set of the common search space, the type of the candidate EPDCCH set is distributed, and the number of the PRB pairs occupied by an EPDCCH set of the common search space is 4.

In the parameters defined above, the location of the combination of the PRB pairs occupied by the candidate EPDCCH set is determined through an indication in a Main Information Block (MIB). For example, three EPDCCH sets are pre-defined, which may be used to carry the common search space. But the common search space of each cell may be only one of the three EPDCCH sets, which are pre-defined to carry the common search space. Information of two bits in reserved bits in the MIB is used as indication information of the EPDCCH set in the common search space to indicate one of the three. For example:

If bits of the indication information of the EPDCCH set in the common search space are "00", the EPDCCH set of the common search space of cell 1 is EPDCCH 0;

If bits of the indication information of the EPDCCH set in the common search space are "01", the EPDCCH set of the common search space of cell 1 is EPDCCH 1;

If bits of the indication information of the EPDCCH set in the common search space are "10", the EPDCCH set of the common search space of cell 1 is EPDCCH 2;

A reserved state is indicated by bits of the indication information of the EPDCCH set in the common search space that are "11".

For cell 1, if the EPDCCH set of the common search space is EPDCCH 1, EPDCCH sets 0 and 2, which are not used to carry the common search space, may be used to carry a PDSCH or the UE specific search space.

In the parameters defined above, the location of the ECCE occupied by the candidate EPDCCH in the candidate EPDCCH set is pre-defined. For example, the ECCE occupied by an EPDCCH search space $S_k^{(L)}$ is $$L \cdot \{(Y_k+m) \bmod \lfloor N_{CCE\_n,k}/L \rfloor\}+i, i=0,1,\ldots L-1$$

where, L is an aggregative level, i.e., the number of the ECCEs occupied by the search space;

k is an index of a subframe;

m is an index of the candidate EPDCCH, m is the index in an EPDCCH set, m=0, 1, ... $M^{(L)}-1$, $M^{(L)}$ is the number of candidate EPDCCHs of which the aggregative level is L and are used for the common search space in an EPDCCH set;

n is an index of the EPDCCH set in subframe k;

$N_{CCE\_n,k}$ is the total number of the ECCEs in EPDCCH set n in subframe k; and $Y_k$ is equal to 0.

In a third method for determining a location of a candidate EPDCCH in a common search space, the number of the candidate EPDCCH sets, the type of a candidate EPDCCH set, and the number of the PRB pairs occupied by the candidate EPDCCH set are pre-defined. For example, the UE only tracks one candidate EPDCCH set of the common search space, the type of the candidate EPDCCH set is distributed, and the number of the PRB pairs occupied by an EPDCCH set of the common search space is 4.

Figure 4:
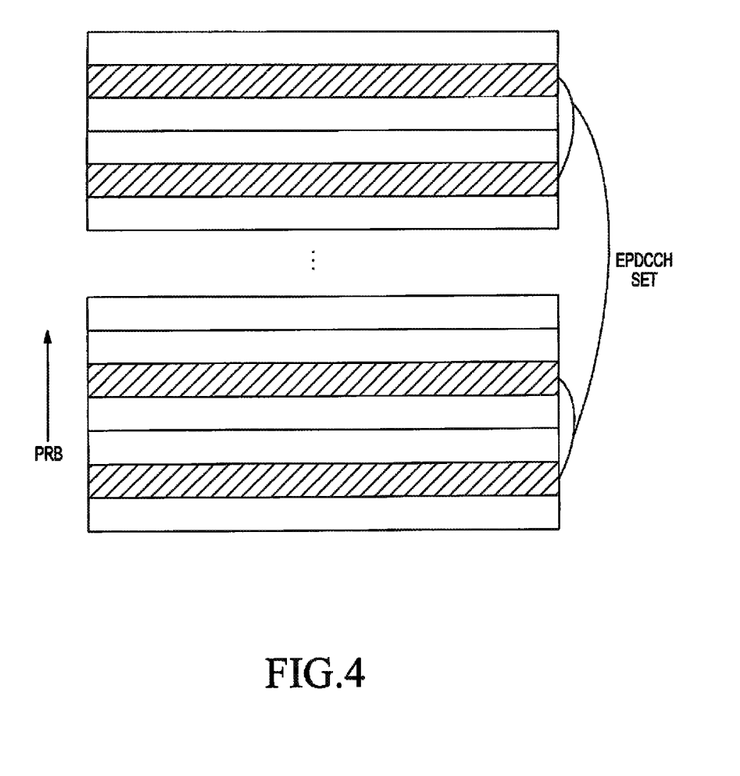
FIG. 4 is a diagram illustrating a pre-defined EPDCCH set of a common search space, in accordance with an embodiment of the present invention.

In the parameters defined above, the location of the combination of the PRB pairs occupied by the candidate EPDCCH set is pre-defined. For example, as shown in FIG. 4, the EPDCCH set of the common search space occupies 4 PRB pairs, i.e., the EPDCCH set of the common search space of each cell occupies the 4 PRB pairs. Thus, the complexity of implementing that the UE tracks an EPDCCH of the common search space is reduced.

In the parameters defined above, the location of the ECCE occupied by the candidate EPDCCH in the candidate EPDCCH set is pre-defined. For example, the ECCE occupied by an EPDCCH search space $S_k^{(L)}$ is $$L \cdot \{(Y_k+m) \bmod \lfloor N_{CCE\_n,k}/L \rfloor\}+i, i=0,1,\ldots L-1$$

where, L is an aggregation level, i.e., the number of the ECCEs occupied by the search space;

k is an index of a subframe;

m is an index of the candidate EPDCCH, m is the index in an EPDCCH set, m=0, 1, ... $M^{(L)}-1$, $M^{(L)}$ is the number of candidate EPDCCHs of which the aggregative level is L and are used for the common search space in an EPDCCH set;

n is an index of the EPDCCH set in subframe k;

$N_{CCE\_n,k}$ is the total number of the ECCEs in EPDCCH set n in subframe k; and $Y_k$ is equal to 0.

As above, the UE determines the location of the candidate EPDCCH of the common search space. A method is required in which the UE determines an aggregation level corresponding to an EPDCCH needed to be blindly detected in the common search space and the number of blind detections for each aggregation level.

In a first method for determining an aggregation level of an EPDCCH needed to be blindly detected in the common search space and the number of blind detections for each aggregation level, the number of the blind detections for each aggregation level of the EPDCCH in the common search space is consistent with a current LTE system. For example, the total number of blind detections (i.e., the maximum number of blind detections) is not changed, i.e., the total number of blind detections for the common search space is 12, where the EPDCCH with 4 ECCEs is blindly detected in 4 candidate locations, and the EPDCCH with 8 ECCEs is blindly detected in 2 candidate locations. In addition, for each transmission mode, two kinds of EPDCCHs with different sizes are blindly detected. Thus, the number of the blind detections for the common search space for the UE is (2+4)*2=12, as shown in Table 2.

TABLE 2

| Kind | Search Space $S_k^{(L)}$ | | The number of candidate EPDCCH $M^{(L)}$ |
|---|---|---|---|
| | Aggregation level L | Size [the number of ECCEs] | |
| common | 4 | 16 | 4 |
| | 8 | 16 | 2 |

A second method for determining an aggregation level of an EPDCCH needed to be blindly detected in the common search space and the number of blind detections for each aggregation level is described in detail below.

In current LTE system, a principle of configuring an aggregation level of a CSS is to maintain coverage. Thus, two maximum aggregation levels are adopted. Accordingly, since the aggregation level may occur in the EPDCCH, which is larger than 8, e.g., 16 or 32, the method defines the blind detections for two largest aggregation levels in the CSS in accordance with the principle of the current LTE system, or defines the blind detections for N largest aggregation levels, where N is greater than or equal to 1, while the EPDCCH with a too small aggregation level is not detected.

Alternatively, an aggregation level blindly detected for the common search space may be configured. The method includes allowing all aggregation levels, e.g., including the aggregation level composed of one ECCE, the aggregation level composed of 2 ECCEs, the aggregation level composed of 4 ECCEs, the aggregation level composed of 8 ECCEs, the aggregation level composed of 16 ECCEs. After an allowed aggregation level is determined in the CSS, the number of the blind detections for each aggregation level is also required to be determined. The number may use higher layer signaling for semi-static configuration, or may be pre-defined in a specification. Two embodiments are described in detail below.

In a first embodiment the total number of the blind detections for the common search space is not changed, i.e., the total number of the blind detections for the common search space is 12. An aggregation level blindly detected in the common search space is not limited to the aggregation level of the EPDCCH composed of 4 ECCEs and the aggregation level of the EPDCCH composed of 8 ECCEs. For example, the EPDCCH that the aggregation level includes one ECCE has one candidate detection location, the EPDCCH with an aggregation level including 2 ECCEs has one candidate detection location, the EPDCCH with an aggregation level including 4 ECCEs has 2 candidate detection locations, the EPDCCH with an aggregation level including 8 ECCEs has 1 candidate detection location, and the EPDCCH with an aggregation level including 16 ECCEs has one candidate detection location, as shown in FIG. 3.

TABLE 3

| | Search Space $S_k^{(L)}$ | | The number of |
|---|---|---|---|
| kind | Aggregation level L | Size [the number of ECCEs] | candidate EPDCCH $M^{(L)}$ |
| Common | 1 | 1 | 1 |
| | 2 | 2 | 1 |
| | 4 | 8 | 2 |
| | 8 | 8 | 1 |
| | 16 | 16 | 1 |

In a second embodiment, the total number of the blind detections for the common search space is added. For example, the number of the blind detections for the common space of the EPDCCH having an aggregation level that includes 4 ECCEs and the EPDCCH having an aggregation level that includes 8 ECCEs is not changed, while the number of the blind detections for the EPDCCH having other aggregation levels is added. For example, the EPDCCH having an aggregation level that includes 4 ECCE has 4 candidate detection locations, the EPDCCH having an aggregation level that includes 8 ECCE has 2 candidate detection locations, one blind detection is added respectively to the EPDCCH having an aggregation that level includes one ECCE, and to the EPDCCH having an aggregation level that includes 2 ECCEs. Thus, the total number of blind detections for the common search space is up to 2*(1+4+2)=16, as shown in Table. 4.

TABLE 4

| | Search Space $S_k^{(L)}$ | | The number of |
|---|---|---|---|
| Kind | Aggregation level L | size [the number of ECCEs] | candidate EPDCCH $M^{(L)}$ |
| common | 1 | 1 | 1 |
| | 2 | 2 | 1 |

TABLE 4-continued

| | Search Space $S_k^{(L)}$ | | The number of |
|---|---|---|---|
| Kind | Aggregation level L | size [the number of ECCEs] | candidate EPDCCH $M^{(L)}$ |
| | 4 | 16 | 4 |
| | 8 | 16 | 2 |

In step 302, the UE performs blind detection for the candidate EPDCCH occupied by the common search space in accordance with the location of the candidate EPDCCH occupied by the common search space determined in step 301. The number of the blind detections performed for each aggregation level of the candidate EPDCCH occupied by the common search space is determined in step 301.

In step 303, the UE determines the location of the candidate EPDCCH occupied by the UE specific search space.

When an NCT cell is a secondary cell, the resource may be configured by a primary cell through a higher layer signal of the secondary cell. The resource is occupied by the UE specific search space composed by the EPDCCH. Parameters needed to be configured include information such as the number of candidate EPDCCH sets used by the EPDCCH of the UE specific search space, a type of each candidate EPDCCH set, the number of PRB pairs occupied by a candidate EPDCCH set, and a location of a PRB pair. Thus, a UE specific EPDCCH search space of the NCT cell as the secondary cell may work normally.

For a stand-alone NCT cell, the location of the resource may not be configured through the higher layer signal of other cells. The resource is occupied by the UE specific search space composed by the EPDCCH. Thus, a method for determining a location of a resource occupied by a UE specific resource location is needed.

Methods for determining a location of resources occupied by a UE specific search space are described in detail below.

The location of the candidate EPDCCH occupied by the UE specific search space include the following content: the number of the candidate EPDCCH sets, the type of each candidate EPDCCH (centralized or distributed), the number of PRB pairs occupied by each candidate EPDCCH set and the location of the PRB pair, the location of the ECCE occupied for composing the EPDCCH set.

The UE specific search space occupies the resource determined by UE characteristics or configured by the high layer signaling.

A first method for determining the location of the resource occupied by the UE specific search space is configured by the higher layer signal.

The method for configuring through the higher layer includes configuring the location of the candidate EPDCCH, including the number of the candidate EPDCCH sets, the type of each candidate EPDCCH set (centralized or distributed), the number of the PRB pairs occupied by the candidate EPDCCH sets, and the location of the PRB pair. The higher layer signal may be a signal of a Random Access Response (RAR), e.g., Random Access CHannel (RACH) msg 4. A reserved bit in the RAR is used to indicate the number of the candidate EPDCCH sets, the type of each candidate EPDCCH (centralized or distributed), the number of the PRB pairs occupied by the candidate EPDCCHs set, and the location of the PRB pair.

For the location of the ECCE occupied by the candidate EPDCCH in the candidate EPDCCH set in the parameters above, the location of the ECCE in the candidate EPDCCH set is pre-defined in the specification. For example, the ECCE occupied by an EPDCCH search space $S_k^{(L)}$ is:

$$L \cdot \{(Y_k+m) \bmod \lfloor N_{CCE\_n,k}/L \rfloor\}+i, i=0,1,\ldots L-1$$

where, L is an aggregation level, i.e., the number of the ECCEs occupied by the search space;

k is an index of a subframe;

m is an index of the candidate EPDCCH, m is the index in the EPDCCH set, m=0, 1, ... $M^{(L)}-1$, $M^{(L)}$ is the number of candidate EPDCCHs of which the aggregation level is L and is used for the common search space in an EPDCCH set;

n is an index of the EPDCCH set in subframe k;

$N_{CCE\_n,k}$ is the total number of the ECCEs in EPDCCH set n in subframe k; and $Y_k=(A \cdot Y_{k-1}) \bmod D$, wherein $Y_{-1}=n_{RNTI} \neq 0$, A=39827, D=65537, $n_{RNTI}$ is a value of a user RNTI.

Another method for higher layer signaling configuration includes configuring the location of the candidate EPDCCH through the higher layer signal, including the number of the candidate EPDCCH sets, the type of each candidate EPDCCH (centralized or distributed), the number of the PRB pairs occupied by each candidate EPDCCH set, and the location of the PRB pair. The higher layer signaling may be a signal for scheduling the EPDCCH of the common search space.

For the location of the ECCE occupied by the candidate EPDCCH in the candidate EPDCCH set in parameters above, the location of the ECCE in the candidate EPDCCH set is pre-defined. For example, the ECCE occupied by an EPDCCH search space $S_k^{(L)}$ is:

$$L \cdot \{(Y_k+m) \bmod \lfloor N_{CCE\_n,k}/L \rfloor\}+i, i=0,1,\ldots L-1$$

where, L is an aggregation level, i.e., the number of the ECCEs occupied by the search space;

k is an index of a subframe;

m is an index of the candidate EPDCCH, m is the index in the EPDCCH set;

n is an index of the EPDCCH set in subframe k;

$N_{CCE\_n,k}$ is the total number of the ECCEs in EPDCCH set n in subframe k; and $Y_k=(A \cdot Y_{k-1}) \bmod D$, wherein $Y_{-1}=n_{RNTI} \neq 0$, A=39827, D=65537, $n_{RNTI}$ is a value of a user radio network temporary identity.

In the two methods for configuring through the higher layer signaling, the UE may determine each aggregation level corresponding to the EPDCCH needed to be blindly detected in the UE specific search space and the number of the blind detections for each aggregation level in accordance with a current related specification, e.g., they are determined based on current specification Release 11.

Figure 5:
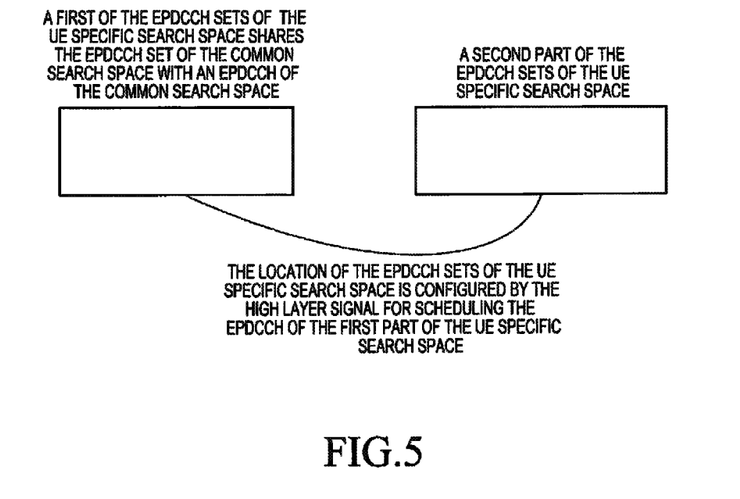
FIG. 5 is a diagram illustrating two parts to which an EPDCCH set used to carry a UE specific search space is divided, in accordance with an aspect of the present invention.

In another method for configuration through higher layer signaling, the EPDCCH set used to carry the UE specific search space may be divided into two parts, as shown in FIG. 5. A first part used for the EPDCCH set of the UE specific search space is fixed, and as is the EPDCCH set of the common search space. A second part of the EPDCCH set of the UE specific search space is further configured in accordance with a requirement of the UE, which may be configured in the EPDCCH of the common search space, and also may be configured in the EPDCCH of the UE specific search space in the first part. The configuration may include configuration for the location of the PRB pair occupied by the candidate EPDCCH set etc. By adopting this method, after determining time and frequency resources of the EPDCCH set configured for the UE specific search space, the UE obtains a part of locations of the time and frequency resource of the UE specific search space at the same time. When needing to transmit some RRC signals and downlink data to the UE, a system may use the candidate EPDCCH belonging to the UE specific search space in the EPDCCH set for scheduling. A base station may search out a suitable aggregation level in accordance with a state of a UE downlink link. Specifically, when the state of the UE link is good, a small aggregation level may be searched out to avoid using a large aggregation level belonging to the candidate EPDCCH of the common search space to transmit the RRC signal and the downlink data, so as to improve resource availability.

For the first part of the UE specific search space, two methods for determining a location of a candidate EPDCCH set of a UE specific search space are described as follows. However, embodiments of the present invention are not limited to these two methods.

In a first method, the ECCEs in the EPDCCH set are ranked in accordance with indexes as: ECC0, ECC1, ..., ECCEn-1. The location of the ECCE occupied by the UE specific search space in the candidate EPDCCH set is pre-defined. For example, the ECCE occupied by an EPDCCH search space $S_k^{(L)}$ is $$L \cdot \{(Y_k+m) \bmod \lfloor N_{CCE\_n,k}/L \rfloor\}+i, i=0,1,\ldots L-1$$

where, L is an aggregation level, i.e., the number of the ECCEs occupied by the search space;

k is an index of a subframe;

m is an index of the candidate EPDCCH;

n is an index of the EPDCCH set in subframe k;

$N_{CCE\_n,k}$ is the total number of the ECCEs in EPDCCH set n in subframe k; and $Y_k=(A \cdot Y_{k-1}) \bmod D$, wherein $Y_{-1}=n_{RNTI} \neq 0$, A=39827, D=65537, $n_{RNTI}$ is a value of a user radio network temporary identity.

In a second method, the ECCEs in the EPDCCH set are ranked in accordance with indexes as: ECC0, ECC1, ..., ECCEn-1. The location of the ECCE occupied by the UE specific search space in the candidate EPDCCH set is pre-defined. For example, the ECCE occupied by an EPDCCH search space $S_k^{(L)}$ is:

$$L \cdot \{(Y_k+m) \bmod \lfloor N_{CCE\_n,k}/L \rfloor\}+i, i=0,1,\ldots L-1$$

where, L is an aggregation level, i.e., the number of the ECCEs occupied by the search space;

k is an index of a subframe;

m is an index of the candidate EPDCCH;

n is an index of the EPDCCH set in subframe k;

$N_{CCE\_n,k}$ is the total number of the ECCEs in EPDCCH set n in subframe k; and $Y_k$ is equal to zero.

For the number of the candidate EPDCCHs in the USS, before the second part of the USS is configured, many candidate EPDCCHs are assigned in the EPDCCH shared with the common search space. When a UE is configured to detect the second part of the USS, the number of the candidate channels may be assigned in the two parts of the USS. For example, the candidate EPDCCH assigned in the first part of the USS is decreased, while the number of the blind detections for the two parts of the USS is not changed. Alternatively, the number of the candidate EPDCCHs of the USS needed to be blindly detected in the EPDCCH set shared with the CSS is fixed and does not depend on whether the second part of the USS is configured. Thus, when the second part of the USS is configured, the candidate EPDCCH needed to be detected in the USS of the UE is added.

Two embodiments for determining the number of blind detections for a UE specific search space in the condition of configuring two parts of the EPDCCH sets are described in detail below.

In a first method for determining the number of the blind detections for the UE specific search space, the total number of the blind detections for a first part of the UE specific search space and a second part of the UE specific search space in each cell is the same with the total number of the blind detections specified in a current LTE. Specifically, if transmission mode uplink MIMO is not configured, the total number of the blind detections for the two parts of the UE specific search space is 32, i.e., a total of the number of the blind detections for the first part of the UE specific search space and the number of the second part of the UE specific search space is 32. If transmission mode uplink MIMO is configured, the total number of the blind detections for the two parts of the UE specific search space is 48, i.e., a total of the number of the blind detections for the first part of the UE specific search space and the number of the second part of the UE specific search space is 48.

In a second method for determining the number of the blind detections for the UE specific search space, the number of the blind detections for a second part of the UE specific search space in each cell is the same with the number of the blind detections in each cell specified in a current LTE. Specifically, if transmission mode uplink MIMO is not configured, the number of the blind detections for the second part of the UE specific search space in each cell is 32. If transmission mode uplink MIMO is configured, the total number of the blind detections for the second part of the UE specific search space in each cell is 48. In addition, the number of the first part of the blind detections in each cell is added. The number of the first part of the blind detections in each cell is M, e.g., M is equal to 6.

Referring again to FIG. 3, in step 304, the UE performs a blind detection for the candidate EPDCCH occupied by the UE specific search space in accordance with the location of the candidate EPDCCH set occupied by the UE specific search space determined in step 303. The number of the blind detections performed for each aggregation level of the candidate EPDCCH of the UE specific search space is determined in step 303.

Figure 6:
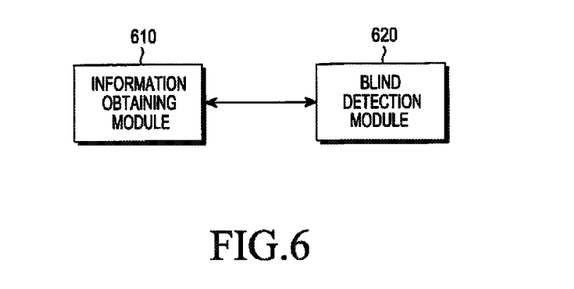
FIG. 6 is a diagram illustrating an apparatus for blindly detecting a common search space and a UE specific search space, in accordance with an aspect of the present invention.

FIG. 6 is a diagram illustrating an apparatus for performing the methods described above, in accordance with an aspect of the present invention. The apparatus includes an information obtaining module 610 and a blind detection module 620.

The information obtaining module 610 determines a location of a candidate EPDCCH occupied by a common search space, and determines a location of a candidate EPDCCH occupied by a UE specific search space.

The blind detection module 620 performs a blind detection for the candidate EPDCCH occupied by the common search space, and performs a blind detection for the candidate EPDCCH occupied by the UE specific search space.

It accordance with the embodiments of the present invention described above, by adopting the technical solution provided in the present invention, the UE can determine the location of the candidate EPDCCH occupied by the common search space and the location of the candidate EPDCCH occupied by the UE specific search space, and the NCT can work stand-alone, so as to improve the flexibility of applying the NCT, which may work not only as the secondary cell, but also as the stand-alone cell.

While the invention has been shown and described with reference to certain embodiments thereof, it will be understood by those skilled in the art that various changes in form and detail may be made therein without departing from the spirit and scope of the invention as defined by the appended claims

What is claimed is:

1. A method for detecting an enhanced physical downlink control channel (EPDCCH) in a user equipment (UE), the method comprising the steps of:
   determining a location of a first enhanced control channel element (ECCE) occupied by at least one of a first candidate EPDCCH in a common search space using predetermined first parameters;
   detecting the first candidate EPDCCH occupied in the common search space based on the determined location of the first ECCE;
   determining a location of a second ECCE occupied by at least one of a second candidate EPDCCH in a specific search space using predetermined second parameters; and
   detecting the second candidate EPDCCH occupied in the specific search space based on the determined location of the second ECCE,
   wherein the common search space and the specific search space comprise a plurality of ECCEs, and the plurality of ECCEs comprised in the common search space and the specific search space is defined by a time resource and a frequency resource in a sub-frame for transmission of the EPDCCH.

2. The method of claim 1, wherein the first parameters comprise a number of first candidate EPDCCH sets used to carry the common search space, a type of each of the first candidate EPDCCH sets, and a number of physical resource block (PRB) pairs occupied by each of the first candidate EPDCCH sets.

3. The method claim 2,
   wherein a location of a combination of the PRB pairs occupied by the first candidate EPDCCH set is determined through a physical cell identity (PCI) modulo operation by the number of the first candidate EPDCCH sets.

4. The method of claim 2,
   wherein a location of a combination of the PRB pairs occupied by the first candidate EPDCCH set is determined by indicate information bits included in a Main Information Block (MIB).

5. The method of claim 1, wherein:
   the location of the first ECCE is:

$L \cdot \{(Y_k+m) \bmod \lfloor N_{CCE\_n,k}/L \rfloor\}+i, i=0, 1, L-1$ where:
   L is an aggregation level, which is a number of ECCEs occupied by the search space;
   k is an index of a subframe;
   m is an index of the candidate EPDCCH, m is the index in the EPDCCH set, m=0,1, ... $M^{(L)}-1$, $M^{(L)}$ is a number of candidate EPDCCHs of which the aggregation level is L and used for the common search space in one EPDCCH set;
   n is an index of the EPDCCH set in subframe k;
   $N_{CCE\_n,k}$ is the total number of the ECCEs in EPDCCH set n in subframe k; and
   Yk is equal to 0.

6. The method of claim 1,
   wherein the second parameters comprise a number of a second candidate EPDCCH sets, a type of each of the candidate second EPDCCH sets, a number of PRB pairs occupied by each of the second candidate EPDCCH sets, a location of a PRB pair, and a location of the second ECCE occupied for composing the second candidate EPDCCH in the second candidate EPDCCH set.

7. The method of claim 6, wherein:
the number of the second candidate EPDCCH sets, the type of each of the second candidate EPDCCH sets, the number of the PRB pairs occupied by each of the second candidate EPDCCH sets, and the location of the PRB pair are configured through a higher layer signal, the high layer signal comprising a signal of a random access response (RAR) or a signal for scheduling the first EPDCCH in the common search space; and
the location of the second ECCE occupied by the second candidate EPDCCH in the second candidate EPDCCH set is pre-defined.

8. The method of claim 7, wherein the second ECCE is:

$$L \cdot \{(Y_k+m) \mod \lfloor N_{CCE\_n,k}/L \rfloor \}+i, i=0,1,\ldots L-1,$$

where:
L is an aggregation level, which is a number of ECCEs occupied by the search space;
k is an index of a subframe;
m is an index of the candidate EPDCCH, m is an index in the EPDCCH set, $M^{(L)}$ is a number of candidate EPDCCHs of which the aggregation level is L and used for the common search space in an EPDCCH set;
n is an index of the EPDCCH set in subframe k;
$N_{CCE\_n,k}$ is a total number of ECCEs in EPDCCH set n in subframe k; and
$Y_k=(A \cdot Y_{k-1}) \mod D$, where $Y_{-1}=n_{RNTI} \neq 0$, A=39827, D=65537, and $n_{RNTI}$ is a value of a Radio Network Temporary Identity (RNTI).

9. The method of claim 6, further comprising:
dividing the second candidate EPDCCH sets used for carrying the specific search space into two parts, wherein a first part of the second candidate EPDCCH sets of the specific search space is the same as first EPDCCH sets of the common search space, wherein a second part of the second candidate EPDCCH sets of the specific search space is configured in accordance with a requirement of the UE, and wherein configuration in accordance with the requirement of the UE comprises configuration by use of a first EDCCH of the common search space or configuration by use of an EDCCH of the first part of the specific search space.

10. The method of claim 9, further comprising:
determining the location of the EPDCCH of the first part of the specific search space by ranking an ECCE in an EPDCCH set in accordance with an index, and pre-defining the location of the ECCE occupied by the EPDCCH of the first part of the specific search space, wherein the location is predefined in accordance with:

$$L \cdot \{(Y_k+m) \mod \lfloor N_{CCE\_n,k}/L \rfloor \}+i, i=0,1,\ldots L-1$$

where:
L is an aggregation level, which is a number of ECCEs occupied by the search space;
k is an index of a subframe;
m is an index of the candidate EPDCCH;
n is an index of the EPDCCH set in subframe k;
$N_{CCE\_n,k}$ is a total number of the ECCEs in EPDCCH set n in subframe k; and
$Y_k=0$, or $Y_k=(A \cdot Y_{k-1}) \mod D$, where $Y_{-1}=n_{RNTI} \neq 0$, A=39827, D=65537, and $n_{RNTI}$ is a value of an RNTI.

11. The method of claim 9, wherein:
a maximum number of blind detections is configured for the first part and a maximum number of blind detections is configured for the second part, and a total of the maximum number of the blind detections for the first part and the maximum number of the blind detections for the second part is 32, or the maximum number of the blind detections for the second part is configured as 32 and a number of the blind detections for the first part is added, when transmission mode uplink multiple input multiple output (MIMO) is not configured; and
the maximum number of the blind detections is configured for the first part and the maximum number of the blind detections is configured for the second part, and the total of the maximum number of the blind detections for the first part and the maximum number of the blind detections for the second part is 48, or the maximum number of the blind detections for the second part is configured as 48 and a number of the blind detections for the first part is added, when the transmission mode uplink MIMO is configured.

12. An apparatus for detecting an enhanced physical downlink control channel (EPDCCH) in a user equipment (UE), comprising:
an information obtaining module configured to determine a location of a first enhanced control channel element (ECCE) occupied by at least one of a first candidate EPDCCH in a common search space using predetermined first parameters, and determine a location of a second ECCE occupied by at least one of a second candidate EPDCCH in a specific search space using predetermined second parameters;
a blind detection module configured to detect the first candidate EPDCCH occupied in the common search space based on the determined location of the first ECCE, and detect the second candidate EPDCCH occupied in the specific search space based on the determined location of the second ECCE
wherein the common search space and the specific search space comprise a plurality of ECCEs, and the plurality of ECCEs comprised in the common search space and the specific search space is defined by a time resource and a frequency resource in a sub-frame for transmission of the EPDCCH.

* * * * *